March 28, 1967     E. B. SZYMCZAK ETAL     3,311,290

MOTOR

Filed Oct. 4, 1965     3 Sheets-Sheet 1

Inventors:
Eugene B. Szymczak
Julius P. Wied
By George R. Clark Atty

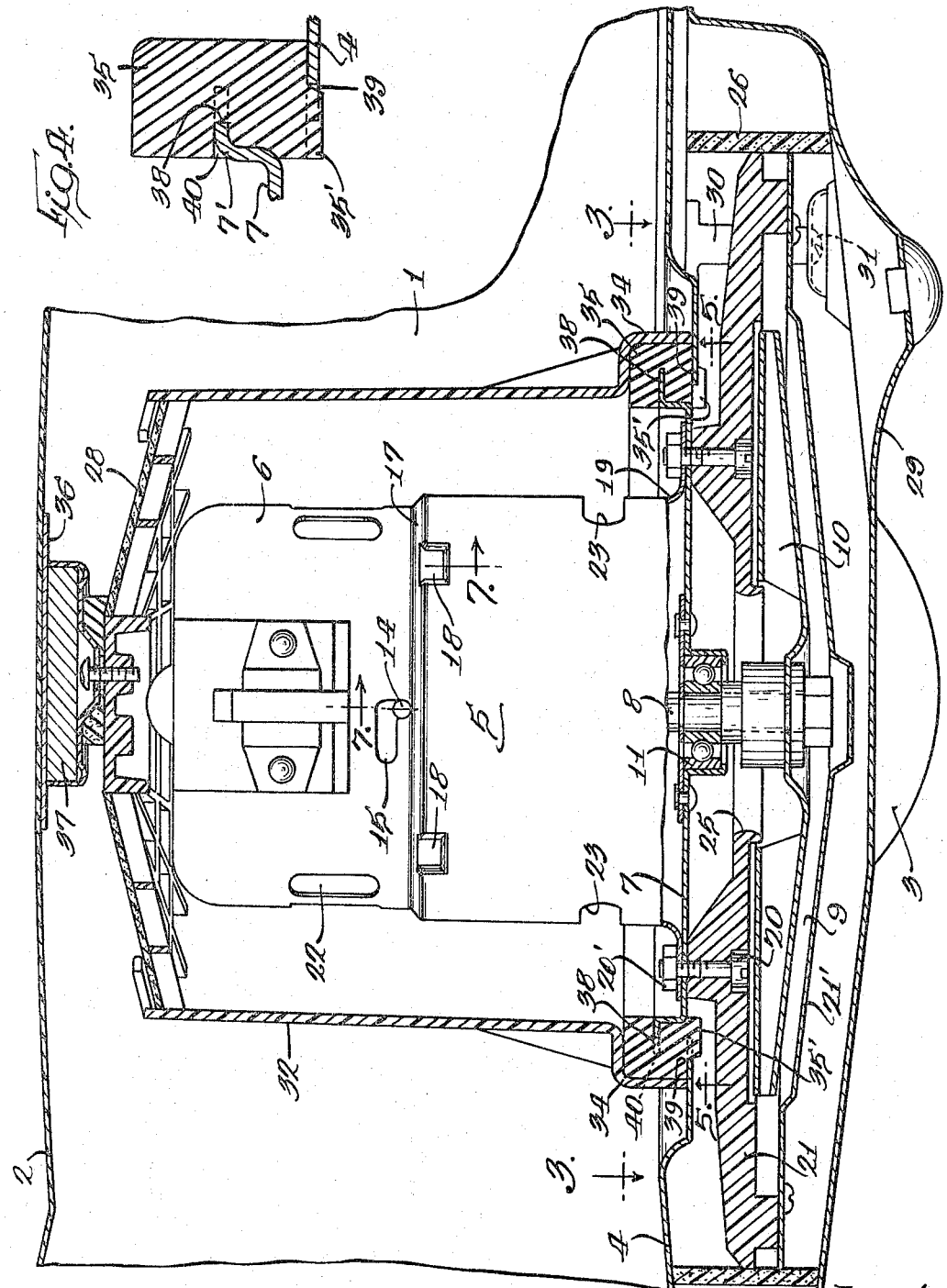

March 28, 1967  E. B. SZYMCZAK ETAL  3,311,290
MOTOR
Filed Oct. 4, 1965  3 Sheets-Sheet 3
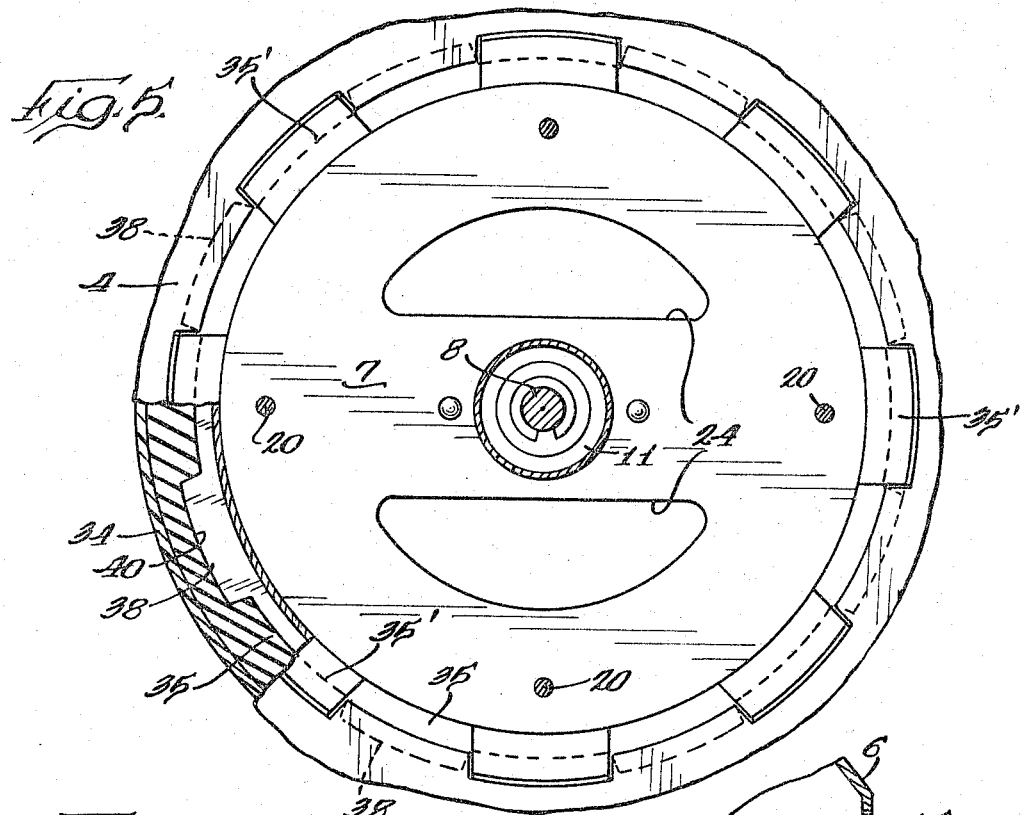
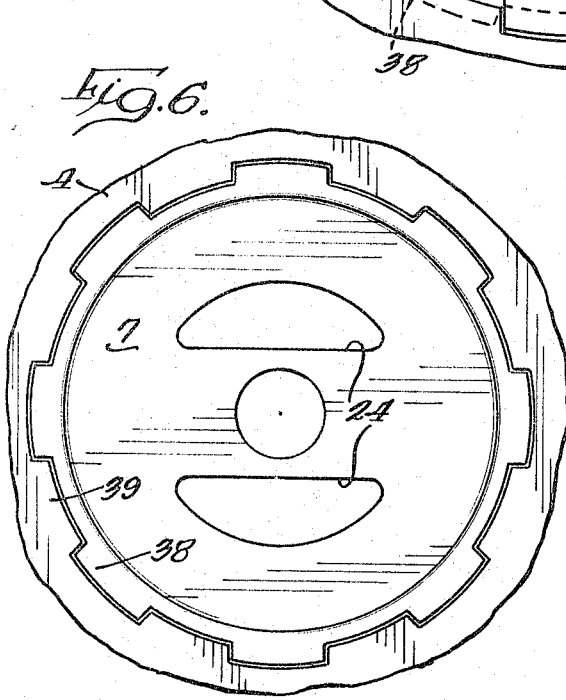
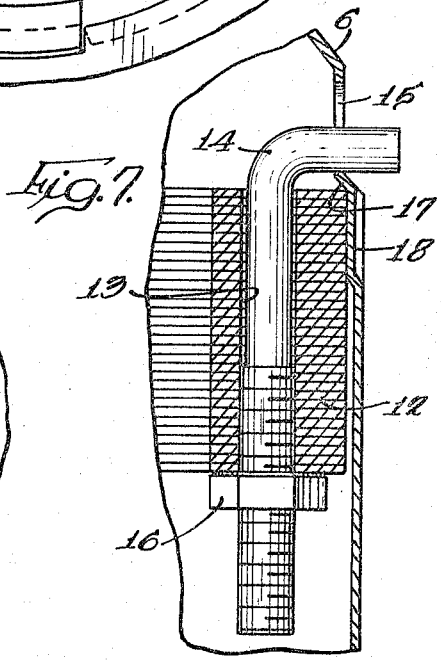
Inventors
Eugene B. Szymczak
Julius P. Wied
By George R. Clark
Atty … # 3,311,290
MOTOR
Eugene B. Szymczak, Chicago, and Julius P. Wied, Oak Park, Ill., assignors to Sunbeam Corporation, Chicago, Ill., a corporation of Illinois
Filed Oct. 4, 1965, Ser. No. 492,504
10 Claims. (Cl. 230—117)

This invention relates to an improved electric motor, and more particularly, to an improved electric motor assembly and mounting.

It is an object of this invention to provide an improved electric motor which is low cost and easy to assemble and mount on a supporting structure.

The improved electric motor and its assembly and mounting is useful in vacuum cleaners and will be described in connection therewith for illustrative purposes.

Briefly, in the invention the stator core of an electric motor is assembled in its shell by L-shaped members connected to the core. Slots are formed in the shell adjacent to one end of the core and the bent ends of the L-shaped members are positioned in the slots to retain the core assembled in the shell.

The mounting support for the motor comprising two plates. One of the plates has a circular opening, and the other is circular in shape. The edges of the circular opening and the circular plate are crenelated. The crenelations overlap each other and if the two plates are partially rotated with respect to each other, the crenelations will pass or clear each other. The motor is positioned on the circular plate and is mounted in position by passing the motor and the circular plate through the opening in the other plate up from the bottom of the other plate. A resilient material ring surrounds the circular plate and the crenelations of the circular plate are embedded in the ring. The ring also serves as a spacer between the two plates to position the circular plate above the other plate. A rigid annular member closely surrounds the ring to compress the same and align the two plates with respect to each other. The compressed resilient material ring acts as a vibration damper and seal between the two plates.

The features of the invention which are believed to be novel are set forth particularly in the claims. The invention itself, however, both as to its organization and operation, together with further objects and advantages thereof, may best be understood by reference to the following description taken in connection with the accompanying drawings.

In the drawings, FIG. 1 is a perspective view of a canister or tank type vacuum cleaner;

FIG. 2 is an enlarged and broken away sectional view of the vacuum cleaner taken along the section line 2—2 of FIG. 1;

FIG. 4 is an enlarged sectional view taken along the section line 4—4 of FIG. 3;

FIG. 5 is a sectional view taken along the section line 5—5 of FIG. 2;

FIG. 6 is an illustration of an intermediate step in mounting the vacuum cleaner motor;

FIG. 7 is an enlarged sectional view taken along the section line 7—7 of FIG. 2.

Figure 1:
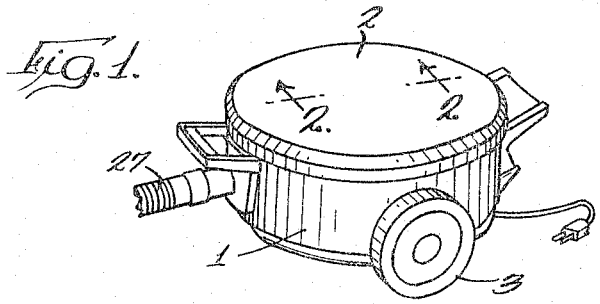

The vacuum cleaner illustrated in FIG. 1 is described in detail in Jepson et al, Patent 3,170,184 and Jepson patent application Ser. No. 163,543 filed January 2, 1962, now allowed. Said patent and pending patent application are both assigned to the same assignee as the instant invention. Only those parts of the vacuum cleaner will be described herein which are necessary for a clear understanding of the invention, and for a more detailed disclosure of the vacuum cleaner, the mentioned patent and the pending patent application can be referreed to.

The vacuum cleaner comprises a pan-shaped casing 1 which is closed by a cover 2. The casing is supported on a pair of wheels 3 on opposite sides thereof. Positioned inside casing 1 and above the bottom 4 thereof is an electric motor indicated generally by reference numeral 5. The motor 5 comprises a motor housing or shell 6. Shell 6 is cylindrical in shape with its axis being vertically disposed. The motor is supported on a circular plate 7 disposed above the bottom 4. An armature shaft 8 of the motor 5 extends downwardly through the plate 7 into a fan chamber 9. Chamber 9 is disposed beneath the plates 4 and 7. A fan 10 is mounted at the lower end of shaft 8 inside the chamber 9. The lower end of shaft 8 is supported by a bearing assembly 11 mounted in the central portion of plate 7.

Motor 5 comprises an annular stator core 12 nested inside the shell 6, see FIG. 7. A plurality of lengthwise extending openings or bores 13 are formed in core 12. L-shaped members or threaded studs 14 are positioned in the openings 13. A plurality of slots 15 are formed in shell 6 adjacent the inner or upper end of core 12. The upper bent ends of the members 14 extend into the slots 15. Fastening means such as threaded nuts 16 are disposed on the other ends of the studs 14. Tightening of the nuts 16 clamps the core in position with respect to shell 6.

Shoulder means 17 is formed in the shell 6 adjacent the upper or inner end of the core 12. Core 12 is seated on shoulder means 17. Shoulder means 17 is disposed between the slots 15 and the upper end of the core. Core 12 is in addition laterally positioned by positioning means 18 formed on shell 6. The means 18 comprise a plurality of integral depressions in the shell 6. The shoulder means 17 also is an integral formation in shell 6. In the prior art, the shell 6 typically comprised a heavy cast member which required machining. In the invention, the shell 6 comprises a light weight thin gauge or sheet metal pressed member which has its necessary portions such as parts 17 and 18 integrally formed therein without any further manufacturing operations such as machining.

The L-shaped studs 14 and nuts 16 are positioned on the core 12 prior to inserting the core into the shell. Shell 6 is inverted when the core 12 is inserted into the shell and the study 14 are turned inwardly away from the position illustrated in FIG. 7. Also, the nuts 16 are hand turned on the studs 14 for only a few turns. After the core is seated on the shoulder means 17 the nuts 16 are rotated by a motor operated wrench. Rotation of nuts 16 causes the bent ends of the studs 14 to automatically swing into the slots 15. Final tightening of the nuts 16 will cause the bent ends of studs 14 to be clamped on to the edges of the slots 15 and the core 12 to be clamped in seated position on the shoulder means 17.

By referring to FIG. 2 it will be seen that the slots 15 extend in a circumferential direction so that the bent ends 14 can be readily swung in and out thereof. The right hand ends of slots 15 have a notch or cut out formed therein so as to firmly seat or hook the bent ends of studs 14 on the notches 15 upon tightening the nuts 16. In other words, the slots 15 in actuality are generally L-shaped. In order to remove the core 12 the shell 6 is inverted and the nuts 16 are power rotated in the opposite direction which first lowers the bent ends of the studs and then swings them out of the slots 15 to clear the shell whereupon the core is freely removable from the shell.

The upper end of the shell 6 is closed whereas its bottom end is open. The plate 7 is perpendicular to the axis of shell 6 and is disposed beneath the shell 6. Shell 6 is provided with a flange 19 at its lower end. The flange 19 and plate 7 are connected together by means such as studs 20 and nuts 20'. The connecting means 20, 20' also connects the fan chamber 9 to motor 5. The fan chamber comprises a circular diffuser member 21 which is closed at its bottom side by a cover member 21'. The fan chamber 9, of course, is disposed beneath the motor and the bottom 4 of the vacuum cleaner casing 1. The shell 6 is provided with not shown air inlet openings at its upper end and also there are air openings 22 and 23 along its sides. The plate 7, which is actually a bottom closure member for the shell 6, is provided with air outlet openings 24 positioned on opposite sides of the bearing assembly 11. The air inlet to the fan chamber 9 comprises a circular opening 25 formed in the central portion of diffuser member 21. The fan chamber 9 is surrounded by a muffler 26 and the air passing through chamber 9 flows through the muffler 26 and then out to the atmosphere through an exhaust passageway not illustrated in the drawings but which will be obvious to those skilled in the art.

An air inlet hose 27, see FIG. 1, is connected to the casing 1. When the motor is energized incoming air and collected dust enter casing 1 through hose 27. The dirt in the incoming air is filtered out by a dust collecting bag, not illustrated, which surrounds the motor. After being filtered the air passes through a further filter element 28. Thereafter the air flows through and around the motor and out of the openings 24 into the fan chamber 9 by way of the opening 25. Thereafter the air is exhausted through the muffler 26 to the atmosphere.

The bottom of casing 1 and fan chamber 9 are covered by a bottom cover 29 which is connected to the bottom 4 of the pan-shaped housing 1 by means such as bosses 30 formed on bottom 4 and studs 31. The motor filter 28 is supported by a molded plastic shell 32 which is radially spaced with respect to the motor shell 6. Shell 32 is cylindrical and at its upper end is provided with an integral grid 33. The bottom of shell 32 is provided with an integral rigid annular portion 34 which serves to compress a resilient ring 35 and align the motor assembly with the vacuum cleaner structure in a manner to be described hereinafter in greater detail. The vacuum cleaner casing 1 is closed by a flexible and metallic cover member 2. Cover 2 is constructed from magnetically attractive material, or a metallic disc 36 of magnetically attractive material can instead be connected to the underside of flexible metallic cover 2. Mounted on the upper end of plastic shell 32 is a magnet 37. The magnet 37 attracts the cover 2 to magnetically retain the cover 2 closed. Since the cover 36 is flexible towards and away from magnet 37 it is unnecessary to maintain close manufacturing tolerances in order to maintain proper closure of the vacuum cleaner casing. Additionally, since the shell 32 is constructed from plastic material it is not necessary to employ a non-magnetic holder for the magnet 37.

Figure 3:
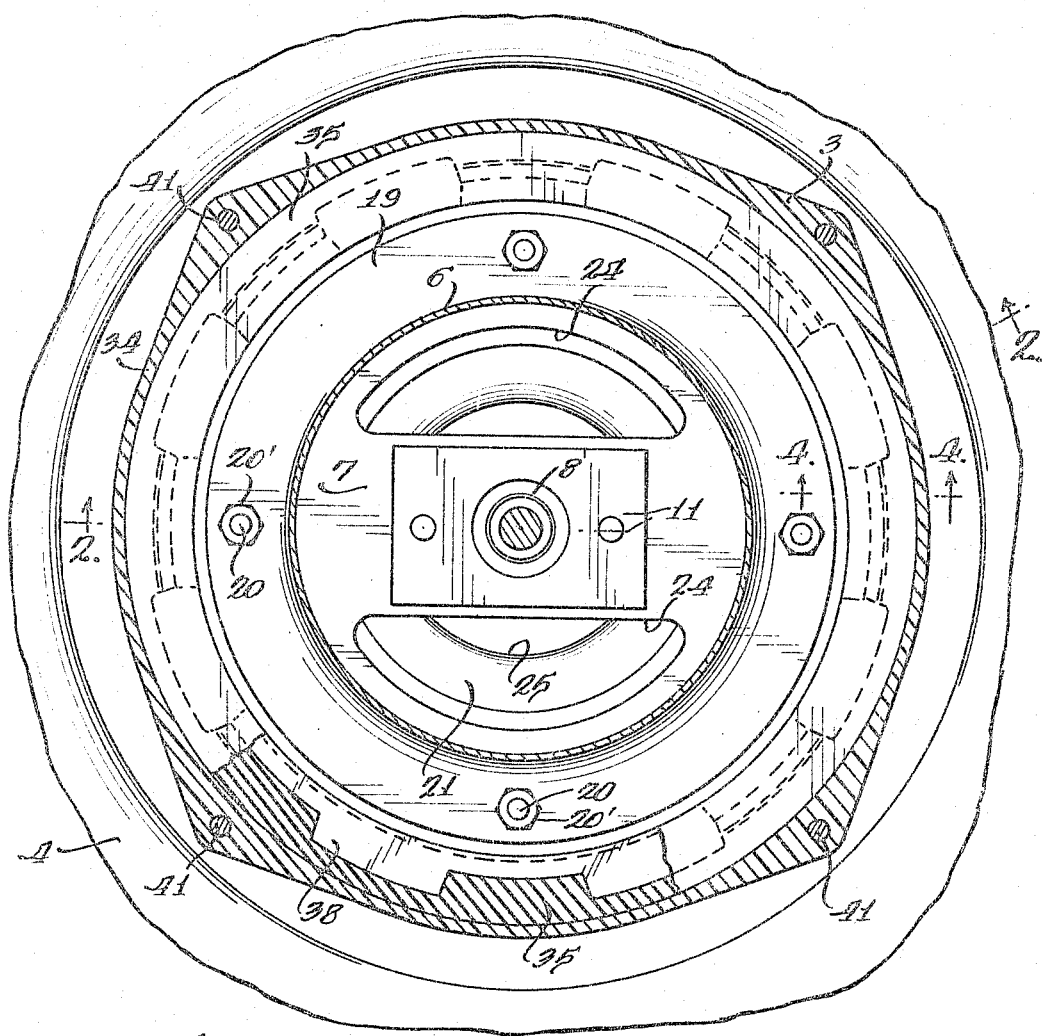
FIG. 3 is a sectional view taken along the section line 3—3 of FIG. 2.

The mounting of the electric motor and its connected fan structure into the vacuum cleaner housing will now be described. The plate 7 is circular and at its periphery is provided with a flange 7'. The outer edge of flange 7' has a crenelated edge 38, see FIGS. 3, 5, and 6. The bottom 4 of the casing 1 is provided with a circular opening which has a crenelated edge 39, see FIGS. 5 and 6. In the assembled position illustrated in FIG. 2, the edge 38 overlaps the edge 39. However, when the two plates 4 and 7 are rotated slightly with respect to each other, as illustrated in FIG. 6, the two edges 38 and 39 will pass or clear each other. The diameter of shell 6 is smaller than the diameter of thte opening 39. Therefore, in assembling the motor and its attached fan structure, the shell 6 is first inserted up through the opening 39 from the bottom of casing 1. Then the edges 38 and 39 are aligned with each other to clear each other. Thereafter the motor assembly is rotated slightly so that the tabs of edge 38 will be overlapped with respect to the tabs of edge 39 so that the motor is suspended on the bottom 4.

It will be appreciated that the fan chamber 9 is pre-assembled with the electric motor and that inasmuch as the fan chamber 9 has a diameter larger than that of opening 39 the only way the motor can be inserted into the vacuum casing 1 is up through the bottom thereof. In final assembled position the edge 38 is vertically spaced above edge 39 by a resilient material or rubber dampening and seal ring 35. The central portion of the inner edge of ring 35 is provided with a crenelated slot 40 having a shape similar to that of the edge 38. In other words, the edge 38 is embedded in the ring 35. The inner portion of the bottom surface of ring 35 is provided with a plurality of integral spacer blocks or the like 35', see FIGS. 2 and 5. These blocks 35' extend down in between the tabs or protrusions of the edge 39 so as to retain the tabs or protrusions of both edges 38 and 39 in overlapped relationship with respect to each other. After the edge 38 is brought up past through the edge 39, the ring 35 is added to the edge 38. Thereafter, the shell 32 is placed in position. Its flanged portion 34 closely or snugly receives the outer and top surface of ring 35 so as to compress the same and retain the plate 7 properly aligned with respect to the bottom plate 4. The assembly is completed by fastening means such as screws or studs 41 extending through openings formed in integral portions of the flange 34 and not shown aligned openings formed in the vacuum cleaner casing bottom plate 4.

Besides being relatively easy to mount in place, the combined motor and blower sub-assembly is also easy to dismount. This is accomplished by first loosening the fastening means 41 and removing the plastic shell 32. Thereafter the rubber ring 35 is removed from about the flange 7'. Then the motor assembly is rotated a few degrees to align the tabs of the crenelated edge 38 with the notches of the crenelated edge 39 whereupon the plate 7 can be dropped to below the bottom plate 4 and then the motor shell 6 withdrawn through the opening 39 in bottom 4.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What is claimed as new and desired to be secured by Letters Patent of the United States is:

1. In a motor, an annular stator core, an annular shell for housing said motor, said core being disposed inside said shell, slots in the sides of said shell adjacent one end of said core, through openings formed in said core lengthwise thereof, L-shaped fastening members extending through said core openings, the bent ends of said fastening members being disposed in said slots, and means at the other ends of said fastening members for fixing said core to said fastening members and fixing the bent ends of said fastening members in their slots.

2. In a motor as in claim 1, wherein said fastening members comprising L-shaped threaded studs, said fixing means comprising threaded nuts on said studs, shoulder means formed inside said shell, said shoulder means being positioned between said one end of said core and said slots, and said core being seated on said shoulder means.

3. In a motor as in claim 2, wherein said slots are L-shaped, said shoulder means being integrally formed on said shell, means integrally formed on the inside of said shell adjacent said shoulder means for concentrically aligning said core with said shell, and said shell comprising a pressed sheet metal member having a closed end and an open end, said core being inserted into said shell through said open end.

4. In a vacuum cleaner, a pan-shaped casing, a circular opening in the bottom of said casing, a motor housing positioned in said casing above said opening, a circular support plate for said motor housing, said support plate being positioned above said opening in spaced and overlapping relationship, said opening and plate having crenelated peripheral edges which are adapted to clear each other when partially rotated with respect to each other, a resilient material spacer ring, said ring being disposed between said crenelated edges and having said plate crenelated edge embedded therein, and a rigid annular member fixed to said casing, said rigid annular member being concentric with said circular opening and closely surrounding said ring for concentrically aligning said plate with said opening.

5. In a vacuum cleaner as in claim 4, wherein said ring has a square cross-section, the central portion of the inner edge of said ring having a continuous crenelated slot formed therein which interfits with the crenelated edge of said support plate, the inner portion of the bottom of said ring having a crenelated surface, said cerenelated surface interfitting with the crenelated edge of said opening, said rigid annular member closely surrounding the outer edge and upper surface of said ring to compress the same, and aligned fastening means formed on said rigid annular member and casing bottom for aligning them together.

6. In a vacuum cleaner as in claim 4, wherein said motor housing and rigid annuar member comprise vertical cylindrical shells which are positioned one within the other, a motor shaft in said motor housing, said shaft extending to below said opening, a fan connected to the lower end of said shaft beneath said opening, said fan having a larger diameter than said opening, said motor housing having a smaller diameter than said opening, whereby said motor housing and its connected fan are assembled with said vacuum cleaner casing by passing said motor housing and its support plate through said opening from beneath said vacuum cleaner casing.

7. In a vacuum cleaner as in claim 6, wherein air inlet and outlet openings are formed in the upper end of said motor housing and said support plate respectively, a grid extending across the upper end of the shell of said rigid annular member, said grid and rigid annular member shell being integrally formed with each other from molded plastic, and a filter element supported on said grid.

8. In a vacuum cleaner as in claim 7, a circular flat fan housing connected to the underside of said support plate, said fan being disposed inside said fan housing, said fan housing being positioned beneath the bottom of said vacuum cleaner casing, air inlet and outlet openings formed in said fan housing, and a cover plate for said fan housing and said vacuum cleaner casing bottom, said cover plate being positioned beneath said fan housing and being connected to said vacuum cleaner bottom, said motor and fan housings being assembled with said vacuum cleaner casing by passing said motor housing and its support plate through said opening from beneath said vacuum cleaner casing.

9. In a vacuum cleaner as in claim 7, wherein said pan-shaped vacuum cleaner casing is closed by a flexible cover having a magnetically attractive portion, and a magnet mounted on said grid for magnetically attracting said flexible cover to retain said cover closed.

10. In an electric motor, a cylindrical motor housing, an annular stator core nested in said housing, means fixing said core in said housing, said fixing means comprising slots formed in the sides of said housing adjacent one end of said core, lengthwise extending through openings formed in said core, L-shaped fastening members positioned in said openings, the bent ends of said fastening members extending into said slots, and core-to-housing clamping means on the other ends of said fastening members, and a mounting assembly for said motor, said assembly comprising a mounting plate positioned beneath said housing perpendicular to the axis thereof, a circular opening in said mounting plate, a circular flange connected to the bottom of said housing, said opening and flange having overlapped crenelated edges which will pass each other upon partial rotation of said edges with respect to each other, the flange crenelated edge being positioned above the mounting plate crenelated edge, a resilient material ring disposed between said crenelated edges, the flange crenelated edge being embedded in said ring, and a rigid annular member fixed to said mounting plate, said rigid annular member being concentric with said circular opening and closely surrounding said ring.

References Cited by the Examiner
UNITED STATES PATENTS

| | | | |
|---|---|---|---|
| 2,020,092 | 11/1935 | Allen | 248—26 |
| 2,036,058 | 3/1936 | Lang | 230—117 |
| 2,889,570 | 6/1959 | Duff | 15—327 |

ROBERT M. WALKER, *Primary Examiner.*